US009131265B2

(12) United States Patent
Ling et al.

(10) Patent No.: US 9,131,265 B2
(45) Date of Patent: Sep. 8, 2015

(54) METHOD AND SYSTEM FOR PROVIDING SATELLITE TELEVISION SERVICE TO A PREMISES

(75) Inventors: Curtis Ling, Carlsbad, CA (US); Tim Gallagher, Encinitas, CA (US); Glenn Chang, Carlsbad, CA (US); Sridhar Ramesh, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 0 days.

(21) Appl. No.: 13/301,400

(22) Filed: Nov. 21, 2011

(65) Prior Publication Data

US 2012/0297426 A1    Nov. 22, 2012

Related U.S. Application Data

(60) Provisional application No. 61/487,979, filed on May 19, 2011.

(51) Int. Cl.
| | |
|---|---|
| *H04N 7/20* | (2006.01) |
| *H04N 21/436* | (2011.01) |
| *H04N 21/61* | (2011.01) |
| *H04N 21/63* | (2011.01) |
| *H04N 21/637* | (2011.01) |
| *H04N 21/64* | (2011.01) |
| *H04N 21/643* | (2011.01) |
| *H04N 21/6402* | (2011.01) |
| *H04N 21/60* | (2011.01) |
| *H04N 21/4367* | (2011.01) |

(Continued)

(52) U.S. Cl.
CPC ..... *H04N 21/43615* (2013.01); *H04N 21/4367* (2013.01); *H04N 21/4405* (2013.01); *H04N 21/4408* (2013.01); *H04N 21/4627* (2013.01); *H04N 21/60* (2013.01); *H04N 21/61* (2013.01); *H04N 21/6106* (2013.01); *H04N 21/6143* (2013.01); *H04N 21/6193* (2013.01); *H04N 21/63* (2013.01); *H04N 21/637* (2013.01); *H04N 21/64* (2013.01); *H04N 21/6402* (2013.01); *H04N 21/64322* (2013.01)

(58) Field of Classification Search
CPC .......................... H04N 21/6143; H04N 21/61
USPC ..................................................... 725/63–72
See application file for complete search history.

(56) References Cited

U.S. PATENT DOCUMENTS

| | | | | |
|---|---|---|---|---|
| 7,542,715 | B1 * | 6/2009 | Gurantz et al. | 455/3.01 |
| 8,611,809 | B1 * | 12/2013 | Popoli | 455/3.02 |

(Continued)

FOREIGN PATENT DOCUMENTS

| | | | | |
|---|---|---|---|---|
| WO | WO 2011/044933 | * | 4/2011 | 725/63 |

*Primary Examiner* — Junior Mendoza

(74) *Attorney, Agent, or Firm* — McAndrews, Held & Malloy

(57) ABSTRACT

Methods and systems for providing satellite television service to a premises may comprise receiving satellite television signals utilizing a satellite dish, converting received satellite signals to internet protocol (IP) signals, and wirelessly communicating the IP signals into a premises to which the satellite dish corresponds. The IP signals may, for example, conform to a multimedia over cable alliance (MoCA) standard or a IEEE 802.11x standard. The wirelessly communicating may comprise magnetic coupling. The received satellite signals may, for example, be converted to IP signals utilizing an IP low-noise block downconverter (IP-LNB) which may comprise full-band capture receivers. The wireless communication of the IP signals may, for example, be within a wireless network of the dwelling or may be independent of a wireless network of the dwelling. The wirelessly communicated IP signals may be beam-formed and may be communicated wirelessly over one or more industrial, scientific, and medical (ISM) bands.

23 Claims, 8 Drawing Sheets

(51) Int. Cl.
*H04N 21/4405* (2011.01)
*H04N 21/4408* (2011.01)
*H04N 21/4627* (2011.01)

(56) References Cited

U.S. PATENT DOCUMENTS

| | | | |
|---|---|---|---|
| 2002/0154055 A1* | 10/2002 | Davis et al. | 342/352 |
| 2005/0245218 A1* | 11/2005 | Jayaramen | 455/192.3 |
| 2006/0189311 A1* | 8/2006 | Cromer et al. | 455/434 |
| 2006/0262222 A1* | 11/2006 | Monnier et al. | 348/572 |
| 2008/0060024 A1* | 3/2008 | Decanne | 725/72 |
| 2009/0007189 A1* | 1/2009 | Gutknecht et al. | 725/64 |
| 2009/0113492 A1* | 4/2009 | Norin et al. | 725/68 |
| 2010/0027411 A1* | 2/2010 | Weber et al. | 370/216 |
| 2011/0047581 A1* | 2/2011 | Caspi et al. | 725/80 |
| 2011/0277001 A1* | 11/2011 | Kaluskar et al. | 725/80 |
| 2012/0297427 A1* | 11/2012 | Chang et al. | 725/70 |

* cited by examiner

METHOD AND SYSTEM FOR PROVIDING SATELLITE TELEVISION SERVICE TO A PREMISES

CROSS-REFERENCE TO RELATED APPLICATIONS/INCORPORATION BY REFERENCE

This application makes reference to and claims priority to U.S. Provisional Application Ser. No. 61/487,979 filed on May 19, 2011, which is hereby incorporated herein by reference in its entirety.

The above stated application is hereby incorporated herein by reference in its entirety.

FIELD OF THE INVENTION

Certain embodiments of the invention relate to multimedia communication. More specifically, certain embodiments of the invention relate to a method and system for providing satellite television service to a premises.

BACKGROUND OF THE INVENTION

Satellite television has advanced from an expensive hobbyist-only technology to a ubiquitous residential television service that rivals cable television, primarily due to reductions in the cost of satellite television reception technology.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for providing satellite television service to a premises, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for providing satellite television service to a premises. Exemplary aspects of the invention may comprise receiving satellite television signals utilizing a satellite dish, converting one or more or the received satellite signals to one or more internet protocol (IP) signals, and wirelessly communicating the one or more IP signals into a premises with which the satellite dish is associated (e.g., into a dwelling to which the satellite dish is affixed). The IP signals may, for example, conform to a multimedia over cable alliance (MoCA) standard or an IEEE 802.11x standard. The wirelessly communicating may, for example, comprise magnetic coupling. The one or more received satellite signals may, for example, be converted to IP signals utilizing an IP low-noise block downconverter (IP-LNB). The IP-LNB may, for example, comprise one or more full-band capture receivers. The wireless communication of the IP signals may, for example, be within a wireless network of the dwelling or may be independent of a wireless network of the dwelling. The wirelessly communicated IP signals may, for example, be beam-formed and directed to a particular receiver within the premises (e.g., to an access point, to a wireless-capable set top box, to a wireless-capable television, etc.). The IP signals may, for example, be communicated wirelessly over one or more industrial, scientific, and medical (ISM) bands.

Figure 1:
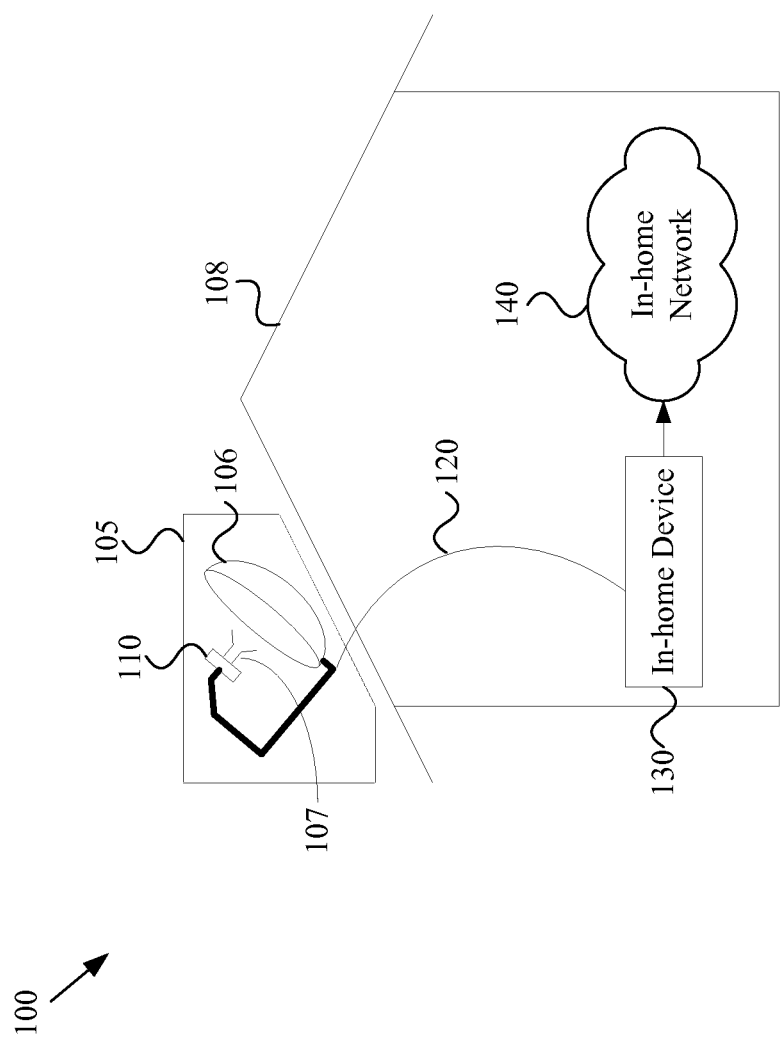
FIG. 1 is a diagram illustrating a satellite television system, in accordance with an embodiment of the invention.

FIG. 1 is a diagram illustrating a satellite television system, in accordance with an embodiment of the invention. Referring to FIG. 1, there is shown a satellite television system 100 comprising a premises 108 (e.g., a home, building, office, any dwelling, etc.). External to the premises 108 is a satellite dish system 105, comprising a satellite dish 106, feed horn 107, and low noise block downconverter (LNB) 110, which will be discussed in more detail below. The satellite dish system 105 outputs one or more IF analog signals and communicates such signals into the premises 107 over one or more cables 120 (e.g., coaxial cables) to an in-home device 130 (e.g., a satellite set top box, an in-home multiswitch, etc.). The in-home device 130 may be connected to an in-home communication network 140.

Figure 2:
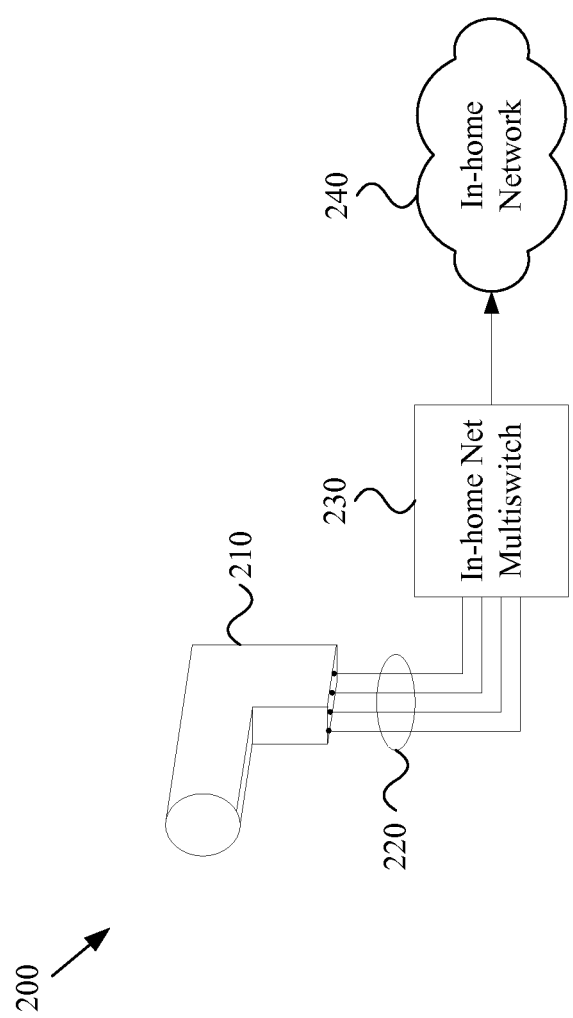
FIG. 2 is a diagram illustrating an exemplary satellite television system, in accordance with an embodiment of the invention.

FIG. 2 is a diagram illustrating an exemplary satellite television system, in accordance with an embodiment of the invention. Referring to FIG. 2, there is shown a television system 200 comprising a low noise block downconverter (LNB) 210 (e.g., as illustrated at item 110 in FIG. 1), which generally operates to amplify a received RF satellite signal and convert such signal to lower frequencies (e.g., intermediate frequencies (or IF)). The LNB 210 is typically collocated with a satellite dish at a satellite dish system (e.g., as illustrated at the satellite dish system 105 of FIG. 1).

Such a system 200 may, for example, be implemented in a manner that receives a plurality of bands. Such implementation may, for example, arise when a satellite dish is receiving signals from multiple orbital slots. In such a configuration, the LNB 210 may output a plurality of IF signals over a plurality of respective cables 220 (e.g., coaxial cables). Each of such a plurality of IF signals may, for example, cover a broadband frequency range (e.g., from 950 MHz to 2150 MHz).

Such a plurality of cables 220 may, for example, terminate at a network multi-switch 230 (e.g., in the home or other customer premises (CP)). The multi-switch 230 may, for example, reside in the customer premises (e.g., in a customer home). Such a multi-switch 230 is an example of the in-home device 130 of FIG. 1. The multi-switch 230 may select channels from the IF signals, where such channels have for example been specified by the provider (and/or customer), and combine such selected channels in an output for communication on a home network 240.

The exemplary system 200 of FIG. 2 suffers from having a plurality of cables 220 coupling the LNB 210, which is generally outside a premises (e.g., outside a customer home) with satellite receiver circuitry located inside a premises.

Figure 3:
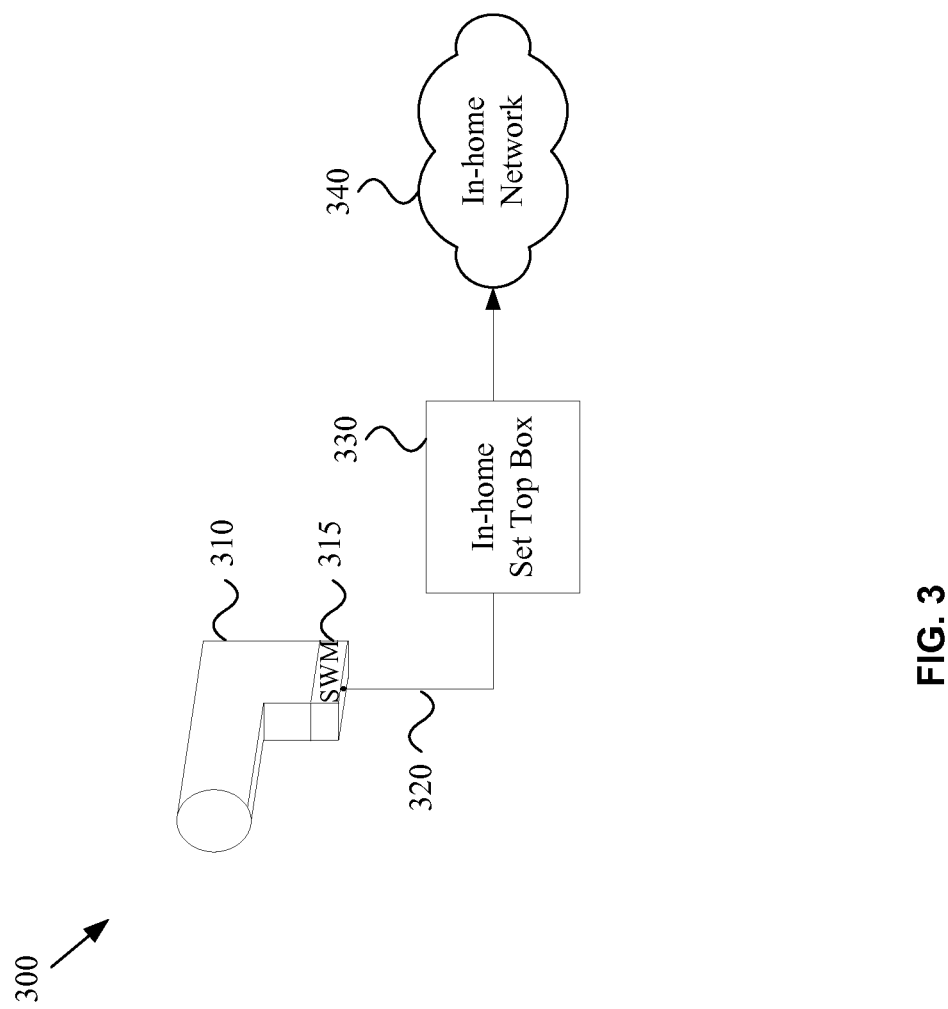
FIG. 3 is a diagram illustrating an exemplary satellite television system, in accordance with an embodiment of the invention.

FIG. 3 is a diagram illustrating an exemplary satellite television system 300, in accordance with an embodiment of the invention. Referring to FIG. 3, there is shown a low noise block downconverter (LNB) 310 (e.g., as illustrated at item 110 in FIG. 1), which generally operates to amplify a received RF satellite signal and convert such signal to lower frequencies (e.g., intermediate frequencies (or IF)). The LNB 310 is typically collocated with a satellite dish at a satellite dish system (e.g., as illustrated at the satellite dish system 105 of FIG. 1).

Such a system 300 may, for example, be implemented in a manner that receives a plurality of bands. Such implementation may, for example, arise when a satellite dish is receiving signals from multiple orbital slots. In such a configuration, the LNB 310 may output a plurality of IF signals. In comparison with the system 200 illustrated in FIG. 2, which communicates the plurality of IF signals over a plurality of respective cables 220, the system 300 of FIG. 3 comprises a single wire module (SWM) 315, communicatively coupled to the LNB 310, that processes the plurality of IF signals from the LNB 310 (e.g., frequency shifting or "channel-stacking" such IF signals) to combine the IF signals (e.g., selected portions thereof) onto a single cable (e.g., a coaxial cable). Such SWM 315 may, for example, comprise a channel stacking switch to perform such functionality. In such a configuration, the SWM 315 may output the stacked IF signals over a cable 320 (e.g., a coaxial cable).

Such a cable 320 may, for example, terminate (e.g., in the home or other customer premises (CP)) at a set top box (STB) 330. The STB 330 may, for example, reside in the customer premises (e.g., in a customer home). Such a set top box 330 is an example of the in-home device 130 of FIG. 1. The STB 330 may then, for example, communicate selected channels over a home network 340 to various other devices (e.g., television devices, media content storage devices, personal computing devices, etc.).

Though the exemplary system 300 of FIG. 3 eliminates the multiple IF cables of the system 200 of FIG. 2, such system 300 still includes the SWM 315, which is a relatively expensive component that consumes a relatively large amount of power. In an exemplary embodiment of the invention, the cable 320 may be replaced by a wireless link from the exterior of a premises to one or more wireless devices inside the premises, thereby eliminating the need to drill a hole in the exterior of the dwelling to enable entry for the cable 320.

Figure 4:
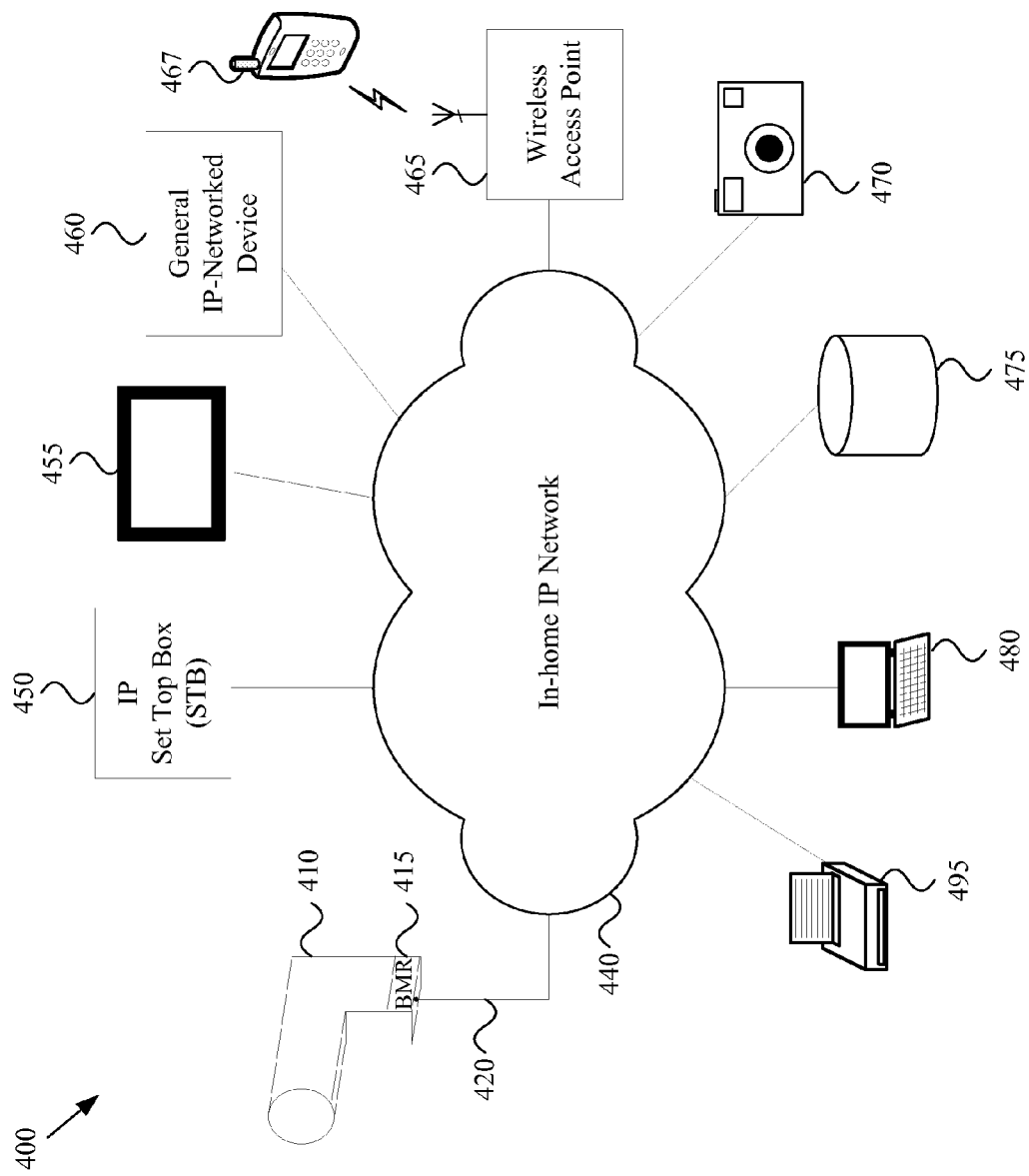
FIG. 4 is a diagram illustrating an exemplary communication system, in accordance with an embodiment of the invention.

FIG. 4 is a diagram illustrating an exemplary communication system 400, in accordance with an embodiment of the invention. Referring to FIG. 4, there is shown a low noise block downconverter (LNB) 410, which generally operates to amplify a received RF satellite signal and convert such signal to lower frequencies (e.g., intermediate frequencies (or IF)). The LNB 410 is typically collocated with a satellite dish at a satellite dish system (e.g., as illustrated at the satellite dish system 105 of FIG. 1).

Such a system 400 may, for example, be implemented in a manner that receives a plurality of bands. Such implementation may, for example, arise when a satellite dish is receiving signals from multiple orbital slots. In such a configuration, the LNB 410 may generate and/or output a plurality of IF signals. In comparison with the system 200 illustrated in FIG. 2 which communicates the plurality of IF signals over a plurality of respective cables 220, the system 400 of FIG. 4 comprises a broadband multichannel receiver (BMR) 415 that processes the plurality of IF signals received from the LNB 410 and outputs a digital signal (e.g., a digital Internet Protocol (IP) signal) that communicates selected channels (e.g., over a single cable 420, over multiple cables 420 numbering less than the number of IF signals from the LNB 410, etc.). The discussion of FIG. 5 below, will include detailed discussion of the BMR 415 (which, when combined with the LNB 410, may also be referred to herein as an IP-LNB 410/415). Additionally, in comparison with the system 300 illustrated in FIG. 3, which utilizes a relatively expensive and power-hungry SWM 315, the exemplary system 400 of FIG. 4 replaces such SWM 315 with a relatively low-cost and energy efficient BMR 415.

As mentioned above, the BMR 415 may output a digital IP signal. The exemplary system 400 comprises a cable 420 (e.g., a coaxial cable) over which the digital IP signal output from the BMR 415 is communicated to an in-home IP network 440 (or in-premises IP network). Such an in-home IP network 440 may comprise various characteristics, non-limiting examples of which will now be presented. The network 440 may, for example, be a cable-based (e.g., a television coaxial cable-based) network. Such an implementation may, for example, utilize an existing in-home cable television network for the communication of IP signals. For example, such a cable-based network 440 may be operated in accordance with a Multimedia over Cable Alliance (MoCA) protocol (e.g., MoCA 1.0, MoCA 1.1, MoCA 2.0, etc.). Also for example, such a cable-based network 440 may be operated in accordance with an ITU G.hn standard (or portion thereof), a HomePNA standard (or portion thereof), etc. In an additional example, the network 440 may be operated in accordance with an Ethernet standard (e.g., gigabit Ethernet), a wireless standard (e.g., 802.11abgn, 802.11ac, etc.), etc. Note that in various implementations, the BMR 415 may communicate with such In-home IP Network 440 via a wireless link.

The in-home IP network 440 may, for example, communicatively couple any of a variety of devices, each of which may in turn be communicatively coupled to the IP-LNB 410/415. Such devices may, for example, reside in the user's home. In an exemplary embodiment of the invention, the cable 420 may be replaced by a wireless link from the exterior of a dwelling (or premises) to one or more wireless devices inside the dwelling, thereby eliminating the need to drill a hole in the exterior of the dwelling to enable entry for the cable 420.

By way of example and not limitation, the system 400 may comprise an IP set top box (IP-STB) 450 that resides in the home and is communicatively coupled to the in-home IP network 440. Such an IP-STB 450 may, for example, communicate directly with the IP-LNB 410/415 (or the BMR 415) outside the home. Also for example, the system 400 may comprise a television 455 (e.g., an IP-capable television) that resides in the home and is communicatively coupled to the in-home IP network 440. Such a television 455 may, for example, communicate directly with the IP-LNB 410/415 (or the BMR 415) outside the home.

Additionally for example, the system 400 may comprise a networked attached storage (NAS) 475 that resides in the home and is communicatively coupled to the in-home IP network 440. Such a NAS 475 may, for example, communicate directly with the IP-LNB 410/415 (or the BMR 415) outside the home. Note that in various implementations, such a NAS 475 (or another NAS) may reside off-premises (e.g., at a location remote from the home), and in such case be communicatively coupled to the IP-LNB 410/415 (or the BMR 415) via the in-home network 440 and one or more other communication networks (e.g., the Internet).

Also for example, the system 400 may comprise a personal computer 480 that is located in the home and is communicatively coupled to the in-home IP network 440 (e.g., directly, via cable modem, via wireless modem, etc.). Such personal computer 480 may, for example, communicate directly with the IP-LNB 410/415 (or the BMR 415) outside the home. Additionally for example, the system 400 may comprise a printer 495 (or other computer peripheral device) that resides in the home and is communicatively coupled to the in-home IP network 440. Such a printer 495 may, for example, communicate directly with the IP-LNB 410/415 (or the BMR 415) outside the home (e.g., for the communication of printable information and/or scanned information that may be communicated via satellite, like program guide information, advertisement information, etc.).

Further for example, the system 400 may comprise a wireless access point 465 (e.g., a wireless router, for example an access point operating in accordance with, for example, any of the 802.11 standards, the Bluetooth standard, a WiMAX standard, a cellular standard, etc.) that is located in the home and is communicatively coupled to the in-home IP network 440 (e.g., directly, via cable modem, etc.). Such wireless access point 465 may, for example, communicate directly with the IP-LNB 410/415 (or the BMR 415) outside the home. For example, such wireless access point 465 may operate to provide a wireless communication link between the in-home network 440 and a wireless device 467 (e.g., a mobile phone, mobile computing device, wireless game controller, personal digital assistant, smart phone, etc.).

Also for example, the system 400 may comprise a camera 470 (e.g., a still and/or moving image camera) that resides in the home and is communicatively coupled to the in-home IP network 440. Such a camera 470 may, for example, communicate directly with the IP-LNB 410/415 (or the BMR 415) outside the home (e.g., for the communication of still and/or moving image information that may be communicated via satellite).

Still further for example, the system 400 may comprise any general IP-Networked Device 460 (e.g., an IP-enabled gaming device, a climate control system, a home security system, or any other IP-enabled device). Such IP-Networked Device may, for example, operate to communicate information with the IP-LNB 410/415 (or the BMR 415) via the in-home IP network 440.

The exemplary system 400 is presented to provide non-limiting exemplary characteristics of an in-home network comprising an IP-LNB 410/415 in accordance with various aspects of the present invention. Accordingly, the scope of various aspects of the present invention should not be limited by any of such exemplary characteristics unless explicitly claimed.

By communicating IP signals from the IP-LNB 410/415, instead of a plurality of IP signals from an LNB as described for the LNB 210 in FIG. 2, the cable 420 may be replaced by a wireless link. In this manner, the cable 420 does not require a hole through a wall or ceiling of a dwelling, as described further with respect to FIG. 6.

Figure 5:
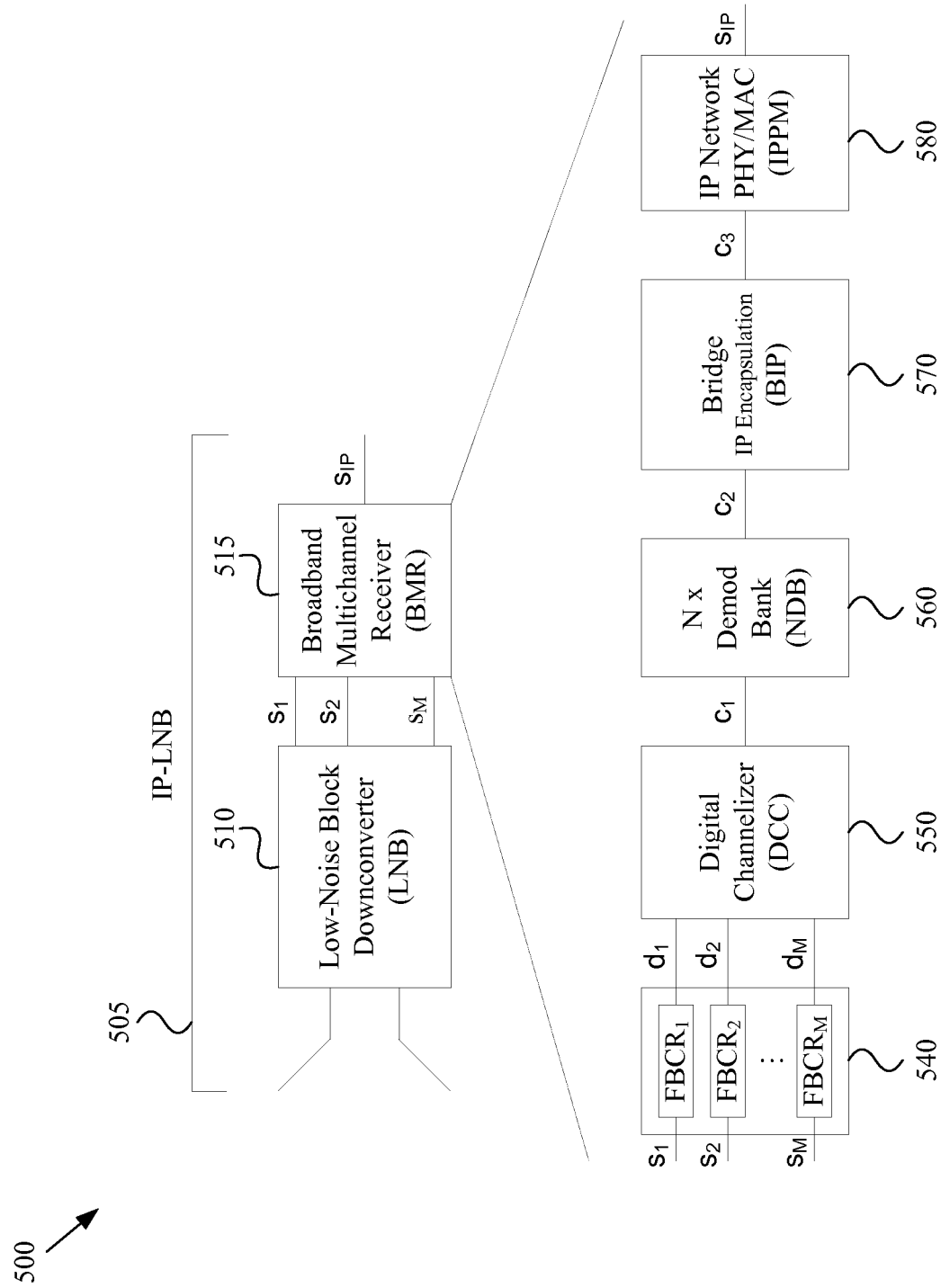
FIG. 5 is a diagram illustrating an exemplary communication system comprising a broadband receiver system, in accordance with an embodiment of the invention.

FIG. 5 is a diagram illustrating an exemplary communication system 500 comprising a broadband receiver system, in accordance with an embodiment of the invention. Referring to FIG. 5, there is shown a communication system 500 which may, for example and without limitation, share any or all aspects with the IP-LNB 410/415 discussed previously with regard to the exemplary system 400 illustrated in FIG. 4.

The exemplary communication system 500 comprises an LNB 510. As discussed previously, such an LNB 510 generally receives RF satellite signals at a satellite dish, and filters and amplifies such signals to generate corresponding IF signals, which are then provided to downstream entities. The LNB 510 may, for example and without limitation, share any and all aspects with the LNBs 110, 210, 310 and 410 illustrated in FIGS. 1-4 and discussed previously. The LNB 510 is illustrated outputting M (an integer number) of IF signals, labeled s1 to sM. Each of such IF signals may, for example, comprise IF signals in the 950 MHz to 2150 MHz range, each of which corresponds to a respective satellite signal (e.g., a satellite television signal).

The exemplary system 500 also comprises a broadband multichannel receiver (BMR) 515. Such BMR 515 may, for example and without limitation, share any or all aspects with the BMR 415 discussed previously with regard to the exemplary system 400 illustrated in FIG. 4. Such BMR 515 may, for example, be operable to (e.g., including operate to and/or operate when enabled to) process the plurality of IF signals s1-sM received from the LNB 510 and output a digital signal (e.g., one or more digital Internet Protocol (IP) signals) that communicates desired channels. For example, a non-limiting exemplary implementation of the BMR 515 is illustrated in FIG. 5, and comprises a variety of modules, for example a Full-Band Capture Receiver bank 540, Digital Channelizer 550, N×Demodulator bank 560, IP Bridge 570, and Communication Interface Module 580 (e.g., an IP communication interface module comprising a MAC and PHY layer for IP networking). Such modules may, for example, be implemented in hardware or a combination of hardware and software.

For example, the BMR 515 may comprise a Full-Band Capture Receiver bank 540 (e.g., comprising M full-band capture receivers, FBCR1-FBCRM. Each of such full-band capture receivers may, for example, digitize the entire IF signal contained on a respective input IF signal from the LNB 510. In an exemplary satellite implementation, each of such full-band capture receivers may, for example, digitize the entire 950 MHz to 2150 MHz range of satellite-related content (e.g., media content) on the respective input signal. For example, FBCR1 may receive analog IF signal s1 from the LNB 510 and digitize the entire IF content of the input signal s1 to generate output signal d1. In such a manner, the full-band capture receiver bank 540 may receive M analog IF signals s1-sM from the LNB 510 and output corresponding digital signals d1-dM.

Note that although the full-band capture receiver bank 540 is shown and discussed as receiving the M analog IF signals s1-sM from the LNB 510, such signals may be received from a plurality of different sources (e.g., from one or more satellite television sources, from one or more cable television sources, from one or more terrestrial broadcast television sources, etc.). Such full-band capture receiver(s) may, for example, operate to capture the complete, or substantially complete, spectral band for a particular communication protocol, standard or not (e.g., for a satellite television communication protocol). Also, such full-band capture receiver(s) may, for example, operate to capture the complete, or substantially complete, respective spectral bands for a plurality of respective communication protocols, standard or not (e.g., for a satellite television communication protocol and/or a cable television communication protocol and/or a terrestrial television communication protocol, etc.).

Note that, depending on the IF bandwidth utilization and/or depending on desired channels, one or more of the plurality of FBCRs of the FBCR bank 540 may be powered down. For example, if a particular FBCR corresponds to a satellite signal that is not presently providing a desired channel, such particular FBCR may be powered down (e.g., until a need for a channel corresponding to the particular FBCR arises). Alternatively, a non-utilized FBCR may also be re-tasked to process another signal (e.g., a signal corresponding to another orbital slot, a signal corresponding to a different signal source, for example, a different satellite and/or terrestrial broadcast source, etc.).

The BMR 515 may also comprise a Digital Channelizer (DCC) 550. The DCC 550 may, for example, operate to receive the digitized signals d1-dM output from the FBCR bank 540. The DCC 550 may then, for example, process such received digitized signals d1-dM (e.g., decimating and filtering such signals) to select desired channels from the set of channels available in the digitized signals d1-dM. As such, the DCC 550 may, for example, serve as a crossbar for selecting an arbitrary set of desired channels from among the channels available from one or more broadband sources.

The DCC 550 may perform such processing in any of a variety of manners. For example and without limitation, the DCC 550 may utilize a polyphase filter or a block that calculates a running FFT of the received digitized signals d1-dM and selects a decimated output from each FFT for further processing. The DCC 550 may, for example, perform switching and routing operations after performing the above-mentioned FFT/filtering operations, which may, for example, beneficially reduce the speed at which the switching and routing operations need be performed.

The further processed output may then, for example, be output on one or more output lines c1 (e.g., output on M output lines, each of which corresponding to one of the M input signals; multiplexed onto a single output line; multiplexed onto more than one and less than M output lines, etc.).

The DCC 550 may, for example, receive channel-selection information from upstream (e.g., via a path from the satellite) and/or from downstream (e.g., from an in-home device) indicative of such desired channels. For example, the channel selection process may be controlled by the operator, by the customer, by both the operator and the customer, etc.

The BMR 515 may additionally comprise an N×Demodulator bank (NDB) 560. Such NDB 560 may, for example, operate to receive the output signal(s) c1 from the DCC 550 and recover the digital information modulated on such received signal(s). The output c2 of the DCC 550 (which may comprise one or more digital signals output on one or more output lines) may, for example, comprise one or more transport streams, including for example, media transport streams like MPEG, general data transport streams, etc.

The BMR 515 may further comprise an IP Bridge (BIP) 570 (or other protocol bridge(s)). Such BIP 570 may, for example, operate to receive the output signal(s) c2 from the NDB 560 (e.g., including transport streams and/or other information) and encapsulate such digital information in IP packets. Such encapsulation may, for example, comprise forming the input digital information into IP packets for downstream communication.

The BIP 570 may also, for example, operate to filter the digital information received from the NDB 560. Such filtering may, for example, comprise various types of data filtering. For example, the BIP 570 may operate to perform packet identification (PID) filtering to select only desired portions of the input data for encapsulation. Such filtering may, for example, beneficially reduce the amount of IP-encapsulated data that is sent downstream from the IP-LNB 505 to the customer premises (e.g., only desired packets are communicated on the in-home IP network). Such filtering may, for example, be controlled by the operator (via control signal(s) received via a satellite channel) and/or by the user (via control signal(s) received from in-home user apparatus).

The BIP 570 may then output the IP-encapsulated data on one or more output signals c3. The BMR 515 may also comprise a communication interface module 580. Such a communication interface module 580 may operate to interface with a communication network (e.g., an in-home communication network). The previous discussion of FIG. 4 presented many non-limiting examples of such an in-home communication. For example and without limitation, the communication interface module 580 may comprise a module that interfaces with an IP network (e.g., operating to perform network layer operation, transport layer operation, MAC layer operation, and/or PHY layer operation compatible with the desired network). In such example, the communication interface module 580 may operate to interface with the IP network by transmitting and/or receiving signals $S_{IP}$ compatible with the IP network.

For example, as discussed above with regard to FIG. 4, the IP-LNB 410/415 (and, for example, the IP-LNB 505 of FIG. 5) may operate to communicate with an in-home communication network. Such an in-home communication network 440 may comprise various characteristics, non-limiting examples of which will now be presented. The network 440 may, for example, be a cable-based (e.g., a television coaxial cable-based) network. Such an implementation may, for example, utilize an existing in-home cable television network for the communication of IP signals. For example, such a cable-based network 440 may be operated in accordance with a Multimedia over Cable Alliance (MoCA) protocol (e.g., MoCA 1.0, MoCA 1.1, MoCA 2.0, etc.). Also for example, such a cable-based network 440 may be operated in accordance with an ITU G.hn standard (or a portion thereof), a HomePNA standard (or a portion thereof), etc. In an additional example, the network 440 may be operated in accordance with an Ethernet standard (e.g., gigabit Ethernet), an Ethernet Passive Optical Network, a Gigabit Passive Optical Network, a wireless standard (e.g., 802.11abgn, 802.11ac, etc.), etc. The network 440 may also, for example, operate in accordance with a protocol that includes aspects of a point-to-point communication protocol, a mesh communication protocol, a tree-structure communication protocol, etc. The communication interface module 515 of the BMR 515 will, for example, operate in the manner appropriate for conducting communication in accordance with the appropriate network architecture and/or protocol.

By communicating IP signals $S_{IP}$ from the IP-LNB 505, instead of a plurality of IP signals from an LNB as described for the LNB 210 in FIG. 2, a cable connection from the IP-LNB 505 may be replaced by a wireless link that operates under a standard wireless protocol, for example. In this manner, drilling a hole through a wall or ceiling of a dwelling is not required, as described further with respect to FIG. 6.

Note that although the communication interface module 580 is shown and discussed interfacing with a single communication network (e.g., a single in-home IP network), the communication interface module 580 may operate to communicate with a plurality of different types of communication networks (e.g., simultaneously, pseudo-simultaneously in a timeshare manner, one at a time, etc.). Many examples of such different types of networks were presented above.

The exemplary system 500 is presented to provide non-limiting exemplary characteristics of an IP-LNB 505 in accordance with various aspects of the present invention. Accordingly, the scope of various aspects of the present invention should not be limited by any of such exemplary characteristics unless explicitly claimed. For example, the previous discussion of the exemplary communication system 500 focuses on a satellite dish system IP-LNB utilization of the exemplary communication system 500. The previously-discussed aspects also generally apply to non-satellite communication systems, and accordingly, the scope of various aspects of the present invention should not be limited by characteristics of satellite communication systems unless explicitly claimed.

Figure 6:
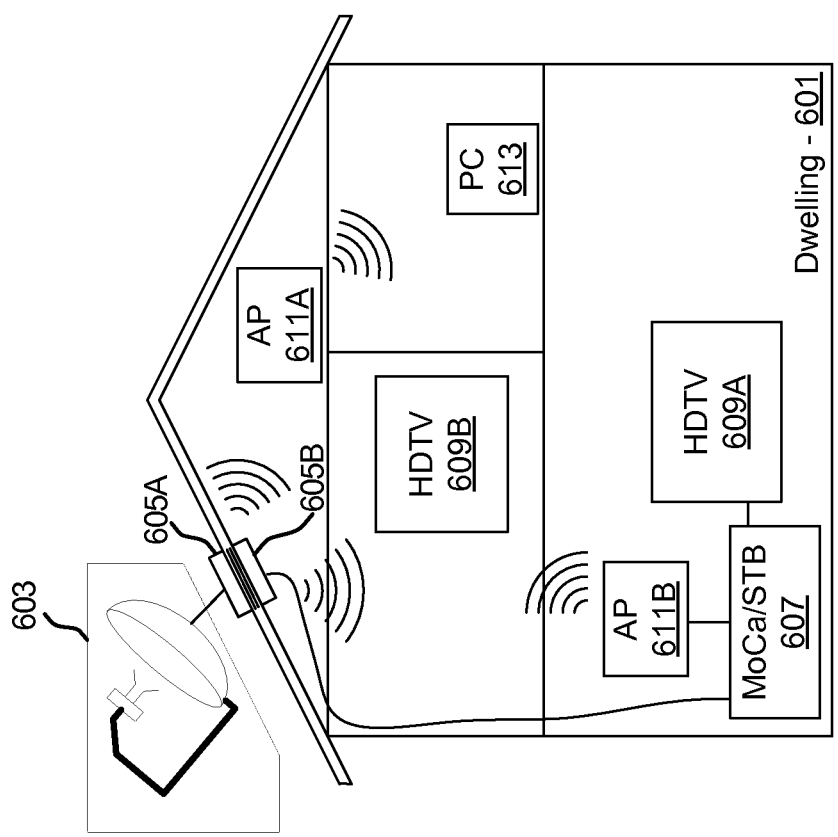
FIG. 6 is a diagram illustrating an exemplary satellite television wireless coupling, in accordance with an embodiment of the invention.

FIG. 6 is a diagram illustrating an exemplary satellite television wireless coupling, in accordance with an embodiment of the invention. Referring to FIG. 6, there is shown a dwelling 601 (e.g., a home, office, single-dwelling unit, multi-dwelling unit, any of a variety of types of premises, etc.), a satellite dish system 603, and a wireless coupler 605A. The dwelling 601 may comprise a wireless coupler 605B, a MoCA/set-top box 607, HDTVs 609A and 609B, access points 611A and 611B, and a personal computer 613.

The MoCA/set-top box 607 may operate under the MoCA 1.x or 2.x specification, for example, and may communicate signals between other MoCA network devices in a ~1-2 GHz frequency range when operating with a cable TV signal or ~400-900 MHz when operating with a satellite TV signal. Other communication protocols may be utilized by the MoCA/set-top box 607, including one or more wireless protocols, such as one or more 802.11x protocols. The MoCA/set-top box 607 may comprise a network controller in the wired network in the dwelling 601, coordinating the wired network communications as per the MoCA standard.

The access points 611A and 611B may be operable to provide wireless network access to devices within the dwelling 601. Exemplary wireless networks may comprise wireless local area networks (WLANs) that conform to an IEEE 802.11 (e.g., a, b, g, n, and/or ac) protocol, femtocells, Bluetooth, ZigBee networks, or any other non-public networks. The access points 611A and 611B may be coupled to the MoCA/set-top box 607 via a wired connection, such as a coaxial cable or an Ethernet cable, for example. In another exemplary scenario, the MoCA/set-top box 607 may comprise native wireless network capability, without the need for the access point 611B to be coupled to it.

The satellite dish system 603 may, for example and without limitation, share any and all aspects with the satellite dish system 105 and associated LNBs 110, 210, 310, 410, and 505 illustrated in FIGS. 1-5 and discussed previously. Accordingly, the satellite dish system 603 may be operable to provide an IP signal into the dwelling 601 via a wireless interface. FIG. 6 shows various exemplary embodiments. For example, the wireless couplers 605A and 605B may be affixed to the outside and inside, respectively, of the dwelling 601 so that a hole does not have to be drilled in the roof or walls of the dwelling 601. Drilling a hole through the exterior of a dwelling may be unsettling to the homeowner, potentially dangerous to the installer and the structure (e.g., the installer could fall, drill into wiring, damage and expose copper electrical service lines to cause a fire, drill into plumbing, etc.), and typically requires the homeowner to be home during the install. By utilizing a wireless coupling, a service provider may set up the satellite dish system 600 and sync up with a box, such as the MoCA/set-top box 607, potentially without having to enter the dwelling 601.

To minimize the power transmitted, the wireless interfaces 605A and 605B may be aligned in close proximity on either side of a wall or roof of the dwelling by a visible or audible indicator such as an LED or buzzer, respectively, which indicates the proximity of wireless interfaces 605A to 605B by lighting up or sounding, respectively. Proximity of 605A and 605B may be estimated by, for example, measuring the signal strength transmitted by one to the other, or the bit error rate, or independently by means of a magnetic sensor.

By terminating the analog satellite signal at the satellite dish system 603, the wireless transmission into the home from the dish may have its own encryption. For example, the encryption may be in accordance with a particular standard being utilized, such as IEEE 802.11n. and may also provide additional security benefits inherent in MIMO or may take advantage of the beam-forming of the standard.

In such a configuration, directional antennas may be utilized to reduce power, reduce noise and interference from other sources, protect the signal from unauthorized listeners, etc. Furthermore, beam-forming (e.g., in accordance with IEEE 802.11n) may also enhance security and/or channel quality and directional frequencies (higher frequencies) may be utilized to enhance security. For example, the wireless signal utilized to communicate the satellite signal into the dwelling 601 may be beam-formed or otherwise directed at a particular receiver inside the dwelling (e.g., with a primary RF signal lobe directed at the particular receiver that is just strong enough to meet communication requirements, and with minimized side lobes to reduce interference (caused and/or experienced) and to reduce susceptibility to hacking).

In another exemplary scenario utilizing WLAN technology, the wireless couplers 605A and 605B may be located at short distances apart and/or configured with directionality, such that another completely separate WLAN may be set up within the home for typical home use. For example, the wireless coupler 605A may communicate over a short-range wireless link with the wireless coupler 605B, which may in turn communicate wirelessly over a standard WLAN via the access point 611A, or from the wireless coupler 605B itself. Alternatively, if the existing in-home wireless network has sufficient bandwidth, both the wireless link between the wireless couplers 605A and 605B and the WLAN provided by the access points 611A and 611B may comprise a shared wireless network supporting all the wireless devices in the dwelling 601.

In another exemplary scenario, the wireless coupler 605A may be located on the roof of the dwelling 601 near the satellite dish system 603 and the wireless coupler 605B may be located at a long distance from the satellite dish system 603. For example, in a multi-dwelling unit, the wireless coupler 605A may communicate wireless IP signals to a plurality of remote wireless couplers in units within the dwelling 601, thereby providing satellite service to multiple subscribers without the need to add multiple cables, and their associated holes into the dwelling.

The wireless couplers 605A and 605B may operate under an existing wireless standard, such as 802.11x or low-power WiMAX, for example, or may utilize a custom wireless protocol. The wireless couplers 605A and 605B may comprise transceivers compliant with one or more standards such as an ITU G.hn standard (or a portion thereof), a HomePNA standard (or a portion thereof), etc. In an additional example, the transceivers may be operable to communicate in accordance with an Ethernet standard (e.g., gigabit Ethernet), an Ethernet Passive Optical Network, a Gigabit Passive Optical Network, a wireless standard (e.g., 802.11abgn, 802.11ac, etc.), etc, and may be connected to a bridge to a wireless standard for transmission between 605A and 605B. This may comprise a single chip or a multi-chip solution.

In instances where a custom wireless link is used, the link could be very simple and in an unused frequency range, such as in the industrial, scientific, and medical (ISM) bands; or a band at millimeter-wave frequencies such as 57-64 GHz where low power transmissions are allowed below a certain level; or white-space frequencies in channels 2-51 as allowed by FCC. A point-to-point link may be minimally complex, for example, disposing of many mechanisms that are unnecessary for simple point-to-point links such as multiple-access mechanisms, interference mechanisms, etc.

In instances where a standard wireless protocol is utilized, to save cost etc., a general-purpose transceiver need not be utilized. For example, general-purpose functionality, such as reverse compatibility mechanisms, various prioritization mechanisms, and relatively high-power components, etc., may be eliminated from a general-purpose WiFi transceiver to make it less costly. Since a primary function of the wireless couplers may be point-to-point communication, and in situations where wireless couplers 605A and 605B are in very close proximity and alignment, the MAC layer processing may be substantially simplified to reduce memory, packet processing and other functions that might otherwise increase the cost of the chip.

In an exemplary scenario, where the wireless couplers 605A and 605B are in close proximity at the roof or an outer wall of the dwelling 601, magnetic coupling may be utilized to communicate the IP signals from the satellite dish system 603. This close proximity may enable secure communications since the magnetic coupling requires an intercepting entity to essentially be within the path of the magnetic coupling field lines, which would be highly unlikely in this instance. In such an exemplary scenario, the digital IP signal may be converted to an analog signal via a digital-to-analog converter (DAC) in the wireless coupler 605A prior to being communicated via magnetic coupling to the wireless coupler 605B. In yet another exemplary scenario, a microwave signal may be utilized to couple IP signals from the satellite dish system 603 in to the dwelling 601.

In another exemplary scenario, wireless signals may be communicated from the satellite dish system 603 via the wireless couplers 605A and 605B and to the access points 611A and 611B, such that the entire path from the LNB in the satellite dish system 603 to nodes in the dwelling 601 may be wireless. Furthermore, since the channel is asymmetric, because of the one-way communication of a home-satellite dish system, the upstream/downstream bandwidth (e.g., duplexing) may be tuned. In instances where the wireless network operates under a wireless standard, it may be utilized in an asynchronous manner (e.g., manage such utilization at a higher layer than MAC). In contrast, if a custom network protocol is utilized, asymmetric operation may be designed into the protocol.

In yet another exemplary scenario, the wireless coupler 605B may communicate electrical signals into power lines in the dwelling 601. In this manner, the IP signal generated by the satellite dish system 603 may be communicated to the entire dwelling 601 over existing wires without requiring additional infrastructure.

Figure 7:
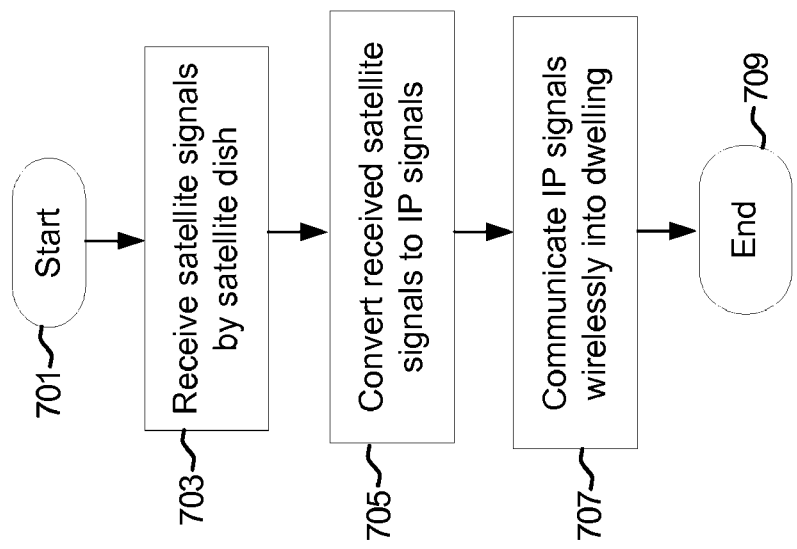
FIG. 7 is a block diagram illustrating exemplary steps in providing satellite television service to a dwelling, in accordance with an embodiment of the invention.

FIG. 7 is a block diagram illustrating exemplary steps in providing satellite television service to a dwelling, in accordance with an embodiment of the invention. The exemplary method illustrated in FIG. 7 may, for example, share any or all functional aspects discussed previously with regard to FIGS. 1-6. Referring to FIG. 7, after start step 701, in step 703, satellite signals may be received by the satellite dish system 603.

In step 705, the received signals may be converted to IP by the IP-LNB 505 (or, for example, to another digital format). Step 705 may, for example and without limitation, share any or all functional aspects discussed previously (e.g., with regard to FIGS. 1-6).

In step 707, the IP signals may be communicated into the dwelling 601 via the wireless couplers 605A and 605B, and subsequently communicated to other devices in the dwelling 601 either wirelessly or via existing cables or wiring in the dwelling 601, followed by end step 711 (or, for example, loops back to step 703 for continued reception of satellite signals).

Figure 8:
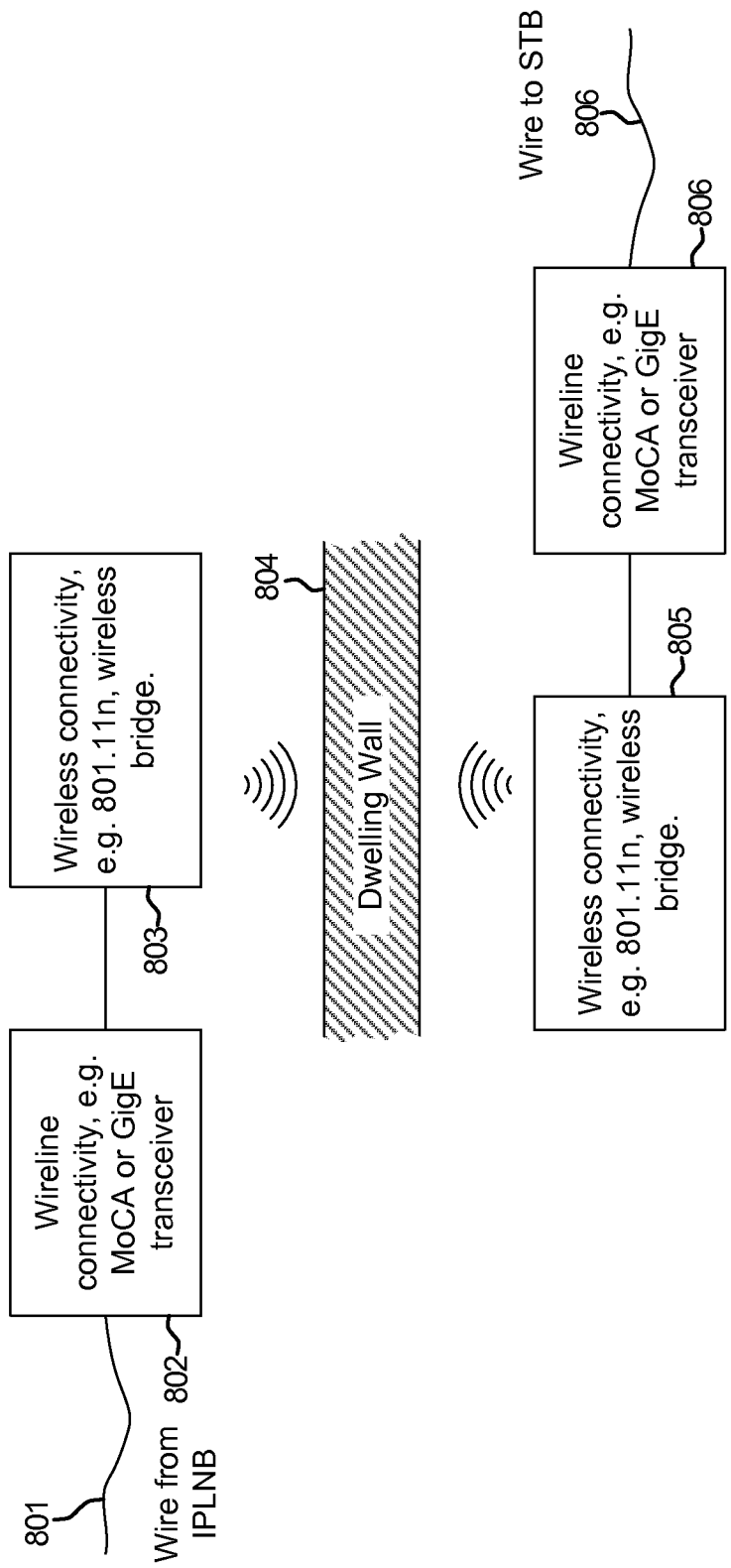
FIG. 8 is a diagram illustrating exemplary wireless coupling through a dwelling wall, in accordance with an embodiment of the invention.

FIG. 8 is a diagram illustrating exemplary wireless coupling through a dwelling wall, in accordance with an embodiment of the invention. Referring to FIG. 8, there is shown a wire 801 from an IP-LNB, wireline transceiver 802, a wireless connectivity/bridge module 803, a dwelling wall 804, a wireless connectivity/bridge module 805, a wireline transceiver 806, and a wire 806. The wireline transceiver 802 and wireless connectivity/bridge module 803 may comprise a single integrated circuit (chip) or may be on two or more chips. Similarly, the wireline transceiver 806 and wireless connectivity/bridge module 805 may comprise a single integrated circuit (chip) or may be on two or more chips.

The wireline transceivers 802 and 806 may be compliant with one or more standards such as an ITU G.hn standard (or a portion thereof), a HomePNA standard (or a portion thereof), etc. In an additional example, the transceivers may be operable to communicate in accordance with an Ethernet standard (e.g., gigabit Ethernet), an Ethernet Passive Optical Network, a Gigabit Passive Optical Network (GPON), etc.

The wireless connectivity/bridge modules 803 and 803 may be operable to bridge from the above described wired standards to a wireless standard (e.g., 802.11abgn, 802.11ac, etc.), thereby providing wireless communication from a plurality of different standards into a dwelling and then back into the same, or alternatively bridged to another wired communication standard. For example, the wireline transceiver 802 may receive GPON signals via the wire 801. The wireless connectivity bridge module 803 may bridge the MPON signals to 802.11ac signals, communicate them wirelessly through the dwelling wall 804 to the wireless connectivity/bridge 805, which may bridge the 802.11ac signals to MoCA signals that may then be communicated over the wire 806 via the wireline transceiver 806 to networked devices, such as a set-top box, for example.

In an embodiment of the invention, a method and system may comprise receiving satellite television signals utilizing a satellite dish 603, converting one or more or the received satellite signals to one or more internet protocol (IP) signals, and wirelessly communicating the one or more IP signals into a dwelling 601 to which the satellite dish 603 is affixed. The IP signals may conform to multimedia over cable alliance (MoCA) standard or the IEEE 802.11x standard. The wirelessly communicating may comprise magnetic coupling. The one or more received satellite signals may be converted to IP signals utilizing an IP low-noise block downconverter (IP-LNB) 505. The IP-LNB 505 may comprise one or more full-band capture receivers 540. The wireless communication of the IP signals may be within a wireless network 611A/611B of the dwelling 601 or may be independent of a wireless network of the dwelling 601. The wirelessly communicated IP signals may be beam-formed. The IP signals may be communicated wirelessly over one or more industrial, scientific, and medical (ISM) bands.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for providing satellite television service to a premises.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system may primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for multimedia communication, the method comprising:
   in a satellite television system:
      receiving, by an Internet protocol low-noise block downconverter (IP-LNB) located at a satellite dish corresponding to a premises, satellite television signals from said satellite dish;
      converting, utilizing said IP LNB, one or more of said received satellite television signals to one or more IP signals, wherein said IP LNB comprises a plurality of full-band capture receivers, each of which comprises a variable gain amplifier and an analog-to-digital converter that concurrently digitizes all frequencies of said satellite television signals; and
      wirelessly communicating, utilizing a wireless coupler that receives the IP signals from said IP LNB and is external to the premises, said one or more IP signals into the premises to a second wireless coupler that is internal to the premises.

2. The method according to claim 1, wherein said IP signals conform to a multimedia over cable alliance (MoCA) standard.

3. The method according to claim 1, wherein said IP signals conform to an IEEE 802.11x standard.

4. The method according to claim 1, wherein said wirelessly communicating comprises magnetic coupling.

5. The method according to claim 1, wherein said IP-LNB comprises a broadband multi-channel receiver.

6. The method according to claim 1, wherein said plurality of full-band capture receivers of the IP-LNB communicates one or more digital output signals to a digital channelizer.

7. The method according to claim 1, wherein said wirelessly communicating comprises wirelessly communicating said one or more IP signals into the premises utilizing a wireless network of said premises.

8. The method according to claim 1, wherein said wirelessly communicating comprises wirelessly communicating said one or more IP signals into the premises independent of a wireless network of said premises.

9. The method according to claim 1, wherein said wirelessly communicating comprises beam-forming said one or more IP signals into a wireless signal directed at a receiver within the premises.

10. The method according to claim 1, wherein said wirelessly communicating comprises communicating said one or more IP signals over one or more industrial, scientific, and medical (ISM) bands.

11. The method according to claim 1, wherein said received satellite television signals comprise L-band signals.

12. A system for multimedia communication, the system comprising:
   one or more circuits in a satellite television system, said one or more circuits being operable to, at least:
      receive, by an internet protocol low-noise block downconverter (IP-LNB) located at a satellite dish corresponding to a premises, satellite television signals from said satellite dish;
      convert, utilizing said IP-LNB, one or more of said received satellite television signals to one or more IP signals, wherein said IP LNB comprises a plurality of full-band capture receivers, each of which comprises a variable gain amplifier and an analog-to-digital converter that concurrently digitizes all frequencies of said satellite television signals; and
      wirelessly communicate, utilizing a wireless coupler that receives the IP signals from said IP-LNB and is external to the premises, said one or more IP signals into the premises to a second wireless coupler that is internal to the premises.

13. The system according to claim 12, wherein said IP signals conform to a multimedia over cable alliance (MoCA) standard.

14. The system according to claim 12, wherein said IP signals conform to an IEEE 802.11x standard.

15. The system according to claim 12, wherein said one or more circuits are operable to wirelessly communicate said one or more IP signal into the premises by, at least in part, utilizing magnetic coupling.

16. The system according to claim 12, wherein said P-LNB comprises a broadband multi-channel receiver.

17. The system according to claim 12, wherein said plurality of full-band capture receivers of the IP-LNB is operable to communicate one or more digital output signals to a digital channelize.

18. The system according to claim 12, wherein said one or more circuits are operable to wirelessly communicate said one or more IP signals into the premises by, at least in part, operating to utilize a wireless network of said premises.

19. The system according to claim 12, wherein said one or more circuits are operable to wirelessly communicate said one or more IP signals into the premises by, at least in part, operating to utilize a wireless communication independent of a wireless network of said premises.

20. The system according to claim 12, wherein said one or more circuits are operable to wirelessly communicate said one or more IP signals into the premises by, at least in part, operating to beam-form said one or more IP signals into a wireless signal directed at a receiver within the premises.

21. The system according to claim 12, wherein said received satellite television signals comprise L-band signals.

22. A system for multimedia communication, the system comprising:
    a satellite television system comprising an Internet protocol low-noise block downconverter (IP-LNB) for location at a satellite dish, a first wireless coupler located externally to premises to which said satellite dish corresponds, and a second wireless coupler located internally to said premises, said satellite television system being operable to, at least:
    receive satellite television signals;
    convert, utilizing said IP-LNB, one or more or said received satellite television signals to one or more internet protocol (IP) signals, wherein said IP LNB comprises a plurality of full-band capture receivers, each of which comprises a variable gain amplifier and an analog-to-digital converter that concurrently digitizes all frequencies of said satellite television signals; and
    wirelessly communicate, utilizing said first wireless coupler that receives said IP signals from said IP-LNB, said one or more IP signals into said second wireless coupler in said premises.

23. The system according to claim 22, wherein said received satellite television signals comprise L-band signals.

* * * * *